Oct. 5, 1926.
J. N. MORTIMER
1,602,118
DIVERTER VALVE
Filed June 21, 1926
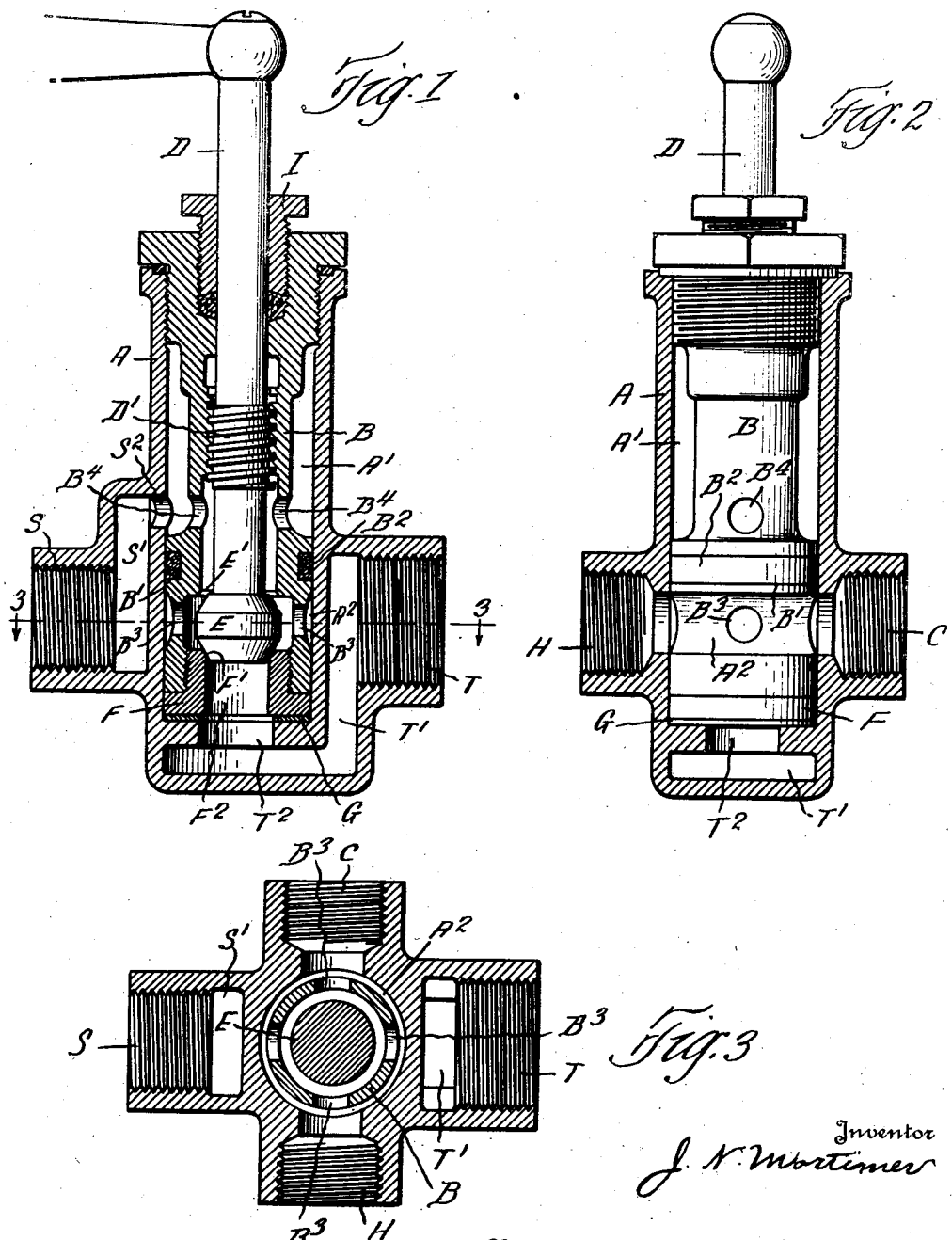

Patented Oct. 5, 1926.

1,602,118

UNITED STATES PATENT OFFICE.

JOHN N. MORTIMER, OF LAKEWOOD, OHIO, ASSIGNOR TO THE CENTRAL BRASS MANUFACTURING COMPANY, OF CLEVELAND, OHIO, A CORPORATION OF OHIO.

DIVERTER VALVE.

Application filed June 21, 1926. Serial No. 117,272.

This invention is a novel construction of valve particularly adapted for use in connection with bath fixtures for the purpose of diverting the water to either the shower or the tub as desired, said valve being arranged in the wall of the bathroom and connected with hot and cold water pipes which are controlled by means of separate valves so that either all hot or all cold or a mixture of hot and cold water can be directed to the valve for diversion.

The object of my invention is to provide a simple and efficient valve of this type comprising a casing and a sleeve insertible therein, said sleeve carrying the valve proper and actuating parts including the valve seats so that whenever any repairs or renewals are necessary the sleeve with valve and actuating parts including the valve seats can be quickly and easily removed from the casing thereby avoiding removal of any portion of the wall or tiling in order to obtain access to the working parts of the device including the valve seats.

Another object of the invention is to provide a valve embodying these advantageous characteristics which can be packed so as to prevent leakage or seepage at any time.

With these and certain other objects in view which will become apparent as the description proceeds the invention consists in the novel features of construction and in the manner of combining or arranging the same, all of which will be fully described herein-after and set forth in the appended claims.

In the drawings forming part of this specification Fig. 1 is a vertical longitudinal sectional view of a valve embodying one form of my invention; Fig. 2 is a sectional view of the casing with the sleeve in elevation; and Fig. 3 is a transverse section on the line 3—3 of Fig. 1.

In carrying out my invention I employ a substantially cylindrical casing A having inlets C and H for the introduction of cold and hot water to the casing. There are also two outlets S and T, the outlet S being for the shower and the outlet T for the tub and where the outlets S and T are arranged, the casing is provided with supplemental chambers S' and T' communicating through the openings S² and T² respectively with the interior of the casing A. Within the cylindrical casing A there is fitted a sleeve B, the outer end of the sleeve being threaded into the threaded outer end of the casing A and the sleeve B is of such length that when properly screwed into the casing the inner end of the sleeve will extend nearly to the inner end of the casing. The diameters of the inner and outer ends of the sleeve are such as to completely fill the inner and outer portions of the casing. Intermediate the ends, however, the sleeve is reduced so that an annular chamber A' is provided between the sleeve and casing and also an annular space A² between the sleeve and casing.

The sleeve is formed with an annular groove B' in which is placed packing B² to provide a tight joint between the sleeve and interior of the casing. Openings B³ are produced in the sleeve so that communication is had between the interior of the sleeve and the annular space A² and openings B⁴ are produced which establish communication between the interior of the sleeve and the annular space A' between the sleeve and casing. A stem D having a threaded portion D' works in the sleeve B and carries a valve E at its inner end and by turning the stem D by means of a suitable handle the valve E is moved back and forth to seat either against the seat E' formed in the sleeve or against the seat F' formed on a threaded plug F screwed into the inner end of the sleeve and removably connected thereto and constituting part of said sleeve, this threaded plug having a central opening F² which communicates with the opening T² which establishes communication between the tub outlet T and the interior of the sleeve. A soft washer G, preferably metal, is arranged between the inner end of the casing and the inner end of the sleeve to provide a tight joint at this point.

A suitable packing gasket I surrounds the outer end of the stem and screws into the threaded recessed end of the sleeve and a suitable sort of packing is interposed between the flanged end of the sleeve and the outer end of the casing.

The hot and cold water would enter the casing through the inlets H and C respectively and as the sleeve is externally reduced or recessed at these points and apertured as at B³ it is obvious that the water would pass immediately to the interior of the sleeve and if the valve E is seated upon its seat E' the water would pass out through the openings F² and T² and passage T' to the tub outlet T whereas if the valve E is seated upon the seat F' the water would pass through the openings B⁴ and thence through the openings S² and passage S' to the shower outlet S.

The packing B² prevents the escape of water except through the proper openings and prevents any leakage between the shower and tub outlets. Should the valve mechanism become impaired it is only necessary to unscrew the sleeve and remove the same entirely from the casing and then the stem and valve can be removed and replaced or repaired, the removal of the plug F at the end of the sleeve permitting the valve and stem to be withdrawn.

A valve such as herein shown and described can be economically fabricated and will successfully perform all of the functions for which it is intended.

Having thus described my invention, what I claim is:—

1. A diverter valve of the kind described comprising a casing having inlets and outlets, a sleeve inserted in said casing and having inlets and outlets, a valve arranged within the casing and having an operating stem, said valve being selectively seatable upon seats arranged within the sleeve, and whereby the water can be diverted to either casing outlet desired.

2. In a device of the kind described, a valve and its operating stem, a sleeve in which said valve and stem are movable, said sleeve having a seat upon which the valve is adapted to seat, a plug inserted in the end of the sleeve and provided with a seat upon which the valve seats, said sleeve having inlet and outlet openings, and a casing within which the sleeve is fitted, said casing having inlet and outlet openings, said inlet and outlet openings of the casing having communication with the inlet and outlet openings of the sleeve.

3. In a diverter valve of the kind described, a casing having inlet openings and outlet openings, a sleeve inserted in said casing and having inlet openings and outlet openings, said sleeve being reduced in diameter externally and whereby annular spaces are provided between the sleeve and casing, said sleeve having an external annular groove, a packing ring arranged in said groove, valve seats arranged within the casing and a valve movable to seat upon either of said seats and whereby water is diverted to either of the casing outlets.

4. A diverter valve of the kind described comprising a casing having inlet openings and outlet openings, a sleeve inserted in said casing, said sleeve being externally reduced at points and providing annular spaces between the sleeve and casing, said sleeve having inlet and outlet openings, said sleeve being open at its inner end, a plug having a central aperture fitted into the inner end of said sleeve, said plug having a valve seat, the sleeve also having a valve seat and a valve arranged within the sleeve and seatable either upon the seat in said sleeve or upon the seat of said plug in the end of said sleeve and a packing interposed between the casing and the sleeve.

5. In a diverter valve of the kind described, a casing having inlet and outlet openings together with passages and openings between the interior of the casing and the outlet openings and a sleeve insertable into and removable from the casing, said sleeve having inlet and outlet openings, a valve carried by and movable within the sleeve and seats arranged within the sleeve and upon which the valve is selectively seated, said sleeve having an external annular groove, a packing arranged therein, said sleeve being reduced externally upon opposite sides of said annular groove.

6. In a diverter valve of the kind described, a casing having inlet ports and outlets together with supplemental chambers and openings communicating with said supplemental chambers and the interior of the casing, a sleeve inserted in said casing, an apertured plug inserted in the inner end of said sleeve and provided with a valve seat, a valve seat within the sleeve, a valve selectively seatable upon either of said seats, said sleeve having inlet and outlet openings, and a packing washer interposed between the inner end of the casing and the inner end of the sleeve for the purpose specified.

In testimony whereof, I hereunto affix my signature.

JOHN N. MORTIMER.